US009811182B2

(12) United States Patent
Bittencourt et al.

(10) Patent No.: US 9,811,182 B2
(45) Date of Patent: Nov. 7, 2017

(54) SLITHER SENSOR

(71) Applicant: International Business Machines Corporation, Armonk, NY (US)

(72) Inventors: Alfredo Xavier Bittencourt, Sao Paulo (BR); Leandro Cassa, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 116 days.

(21) Appl. No.: 13/904,292

(22) Filed: May 29, 2013

(65) Prior Publication Data

US 2014/0078057 A1 Mar. 20, 2014

(30) Foreign Application Priority Data

Sep. 14, 2012 (CA) .................................... 2789926

(51) Int. Cl.
*G06F 3/0354* (2013.01)
*G06F 3/041* (2006.01)

(52) U.S. Cl.
CPC .......... *G06F 3/03547* (2013.01); *G06F 3/041* (2013.01)

(58) Field of Classification Search
USPC .................................... 345/156–179; 349/12
See application file for complete search history.

(56) References Cited

U.S. PATENT DOCUMENTS

| | | | |
|---|---|---|---|
| 5,215,088 A * | 6/1993 | Normann et al. ............ 600/377 | |
| 5,748,185 A | 5/1998 | Stephan et al. | |
| 6,188,393 B1 | 2/2001 | Shu | |
| 6,445,284 B1 * | 9/2002 | Cruz-Hernandez ..... G06F 3/016 | 340/4.12 |
| 6,496,180 B1 | 12/2002 | Hedman | |
| 6,587,093 B1 | 7/2003 | Shaw et al. | |
| 6,693,516 B1 * | 2/2004 | Hayward ............. G09B 21/004 | 340/4.12 |
| 6,757,002 B1 | 6/2004 | Oross et al. | |

(Continued)

FOREIGN PATENT DOCUMENTS

| | | |
|---|---|---|
| CN | 1796954 A | 7/2006 |
| CN | 101907935 A | 12/2010 |

(Continued)

OTHER PUBLICATIONS

Benko et al., "Enhancing Input on and Above the Interactive Surface with Muscle Sensing", ITS '09, Nov. 23-25, 2009, 8 pages.

(Continued)

*Primary Examiner* — Jennifer Mehmood
*Assistant Examiner* — Deeprose Subedi
(74) *Attorney, Agent, or Firm* — Daniel Simek; Hoffman Warnick LLC

(57) ABSTRACT

An illustrative embodiment of an apparatus for a sensing array comprising a bus, a set of spaced apart elements connected to the bus, wherein each element of the set of elements generates a signal representative of a stimulation when received at each element, a signal processor in communication with the bus, wherein the signal processor generates vector information using an aggregation of the signals from the set of elements and a transmitter for sending the vector information to an application interface wherein the vector information indicates a movement within the sensing array.

18 Claims, 7 Drawing Sheets

(56) References Cited

U.S. PATENT DOCUMENTS

| | | | |
|---|---|---|---|
| 6,995,747 B2 | 2/2006 | Casebolt et al. | |
| 7,042,441 B2 | 5/2006 | Adams et al. | |
| 7,077,015 B2* | 7/2006 | Hayward | G06K 9/00013 |
| | | | 73/862.041 |
| 7,283,124 B2 | 10/2007 | Pai | |
| 7,358,963 B2 | 4/2008 | Low et al. | |
| 7,417,622 B2 | 8/2008 | Lian | |
| 9,323,327 B2* | 4/2016 | Aleksov | G06F 3/0412 |
| 2005/0131578 A1 | 6/2005 | Weaver | |
| 2008/0010616 A1* | 1/2008 | Algreatly | 715/856 |
| 2008/0150898 A1 | 6/2008 | Low et al. | |
| 2008/0198145 A1 | 8/2008 | Knowles et al. | |
| 2009/0153500 A1 | 6/2009 | Cho et al. | |
| 2009/0256817 A1* | 10/2009 | Perlin et al. | 345/174 |
| 2010/0090973 A1* | 4/2010 | Algreatly | 345/173 |
| 2010/0122205 A1 | 5/2010 | Jarrett et al. | |
| 2010/0207490 A1* | 8/2010 | Chuang | H01L 41/1132 |
| | | | 310/338 |
| 2010/0277428 A1 | 11/2010 | Kumazawa | |
| 2010/0283356 A1* | 11/2010 | Tamai | H02N 2/0065 |
| | | | 310/323.06 |
| 2011/0181534 A1 | 7/2011 | Palacios | |
| 2014/0009440 A1* | 1/2014 | Ferren | G06F 3/041 |
| | | | 345/174 |

FOREIGN PATENT DOCUMENTS

| | | | | |
|---|---|---|---|---|
| DE | EP 2336742 A1 * | 6/2011 | | G01B 7/28 |
| EP | 2090965 A1 | 8/2009 | | |
| EP | 2336742 A1 * | 6/2011 | | |
| WO | WO2012087286 A1 * | 6/2012 | | |
| WO | WO 2012087286 A1 * | 6/2012 | | G06F 3/041 |

OTHER PUBLICATIONS

Jian-Guo et al., "A Novel Multi-Touch Human-Computer-Interface Based on Binocular Stereo Vision", IEEE Xplore, May 15-16, 2009, Abstract, 1 page.

Office Action for CN Application No. 20130413688.1, dated Jan. 25, 2016, 8 pages.

\* cited by examiner

Sensor system
300

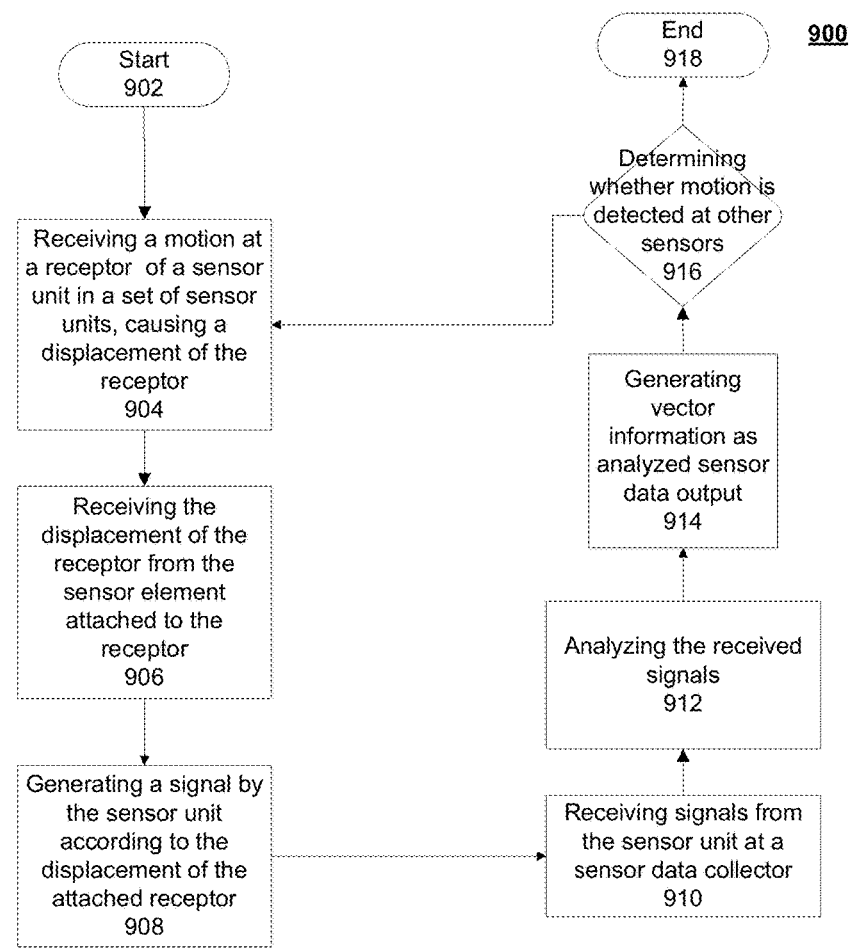

SLITHER SENSOR

BACKGROUND

1. Technical Field

This disclosure relates generally to a user interface device in a data processing system and more specifically to using a sensor array associated with a pointing device in the data processing system.

2. Description of the Related Art

Various external pointing devices enable an operator to select an object and to navigate through a plurality of objects to manipulate objects displayed in a user interface. For example, in a typical data processing environment a pointing device in the form of a mouse is provided with a slider used to control the scrolling of an image on a computer screen. In another example, another device uses a housing and an optical touch pad carried by the housing. The optical touch pad is configured to translate finger motion into movements on the display screen. The touchpad may having multiple regions, including a scroll control region, wherein movement of a contact point in the cursor control region causes movement of a cursor in the graphical user interface.

Typical devices require dexterity and fine motor control on behalf of the user. Industrial uses requiring protective covering of hands make use of the current pointing devise troublesome.

SUMMARY

According to an embodiment, an apparatus for a sensing array comprises a bus, a set of spaced apart elements connected to the bus, wherein each element of the set of elements generates a signal representative of a stimulation received; a signal processor in communication with the bus, wherein the signal processor generates vector information using signals from the set of elements and a transmitter for sending the vector information to an application interface wherein the vector information indicates a movement within the sensing array.

According to another embodiment, a computer-implemented method for using a sensor array receives a motion at a receptor of a sensor unit in a set of sensor units, causing a displacement of the receptor and receives the displacement of the receptor by the sensor element attached to the receptor. The computer-implemented method generates a signal by the sensor unit according to the displacement of the attached receptor. The computer-implemented method further receives signals from the sensor unit at a sensor data collector, analyzes the received signals, and generates vector information as analyzed sensor data output.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

FIG. 9 is a flowchart of a processing using a device with a sensor array operable for various embodiments of the disclosure.

DETAILED DESCRIPTION

Figure 1:
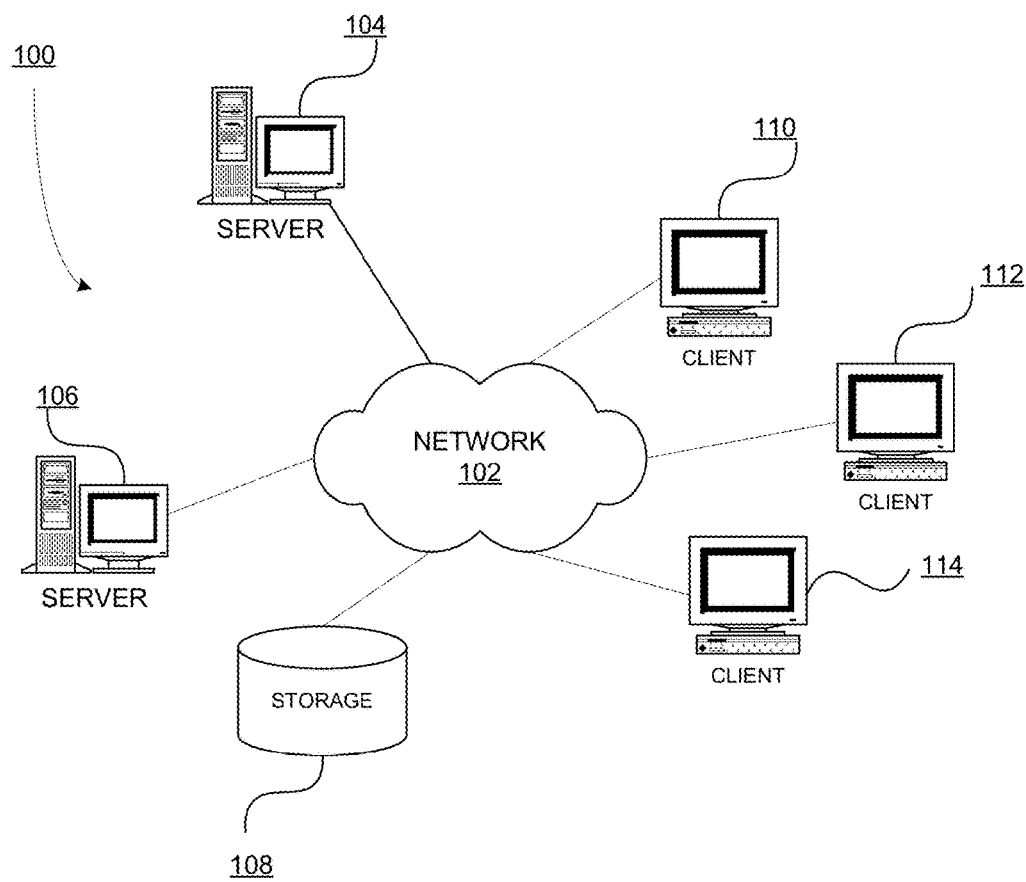
FIG. 1 is a block diagram of an exemplary network data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable data storage medium(s) may be utilized. A computer-readable data storage medium may be, for example, but not limited to, an electronic, magnetic, optical, or semiconductor system, apparatus, or device, or any suitable combination of the foregoing. More specific examples (a non-exhaustive list) of the computer-readable data storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing. In the context of this document, a computer-readable data storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
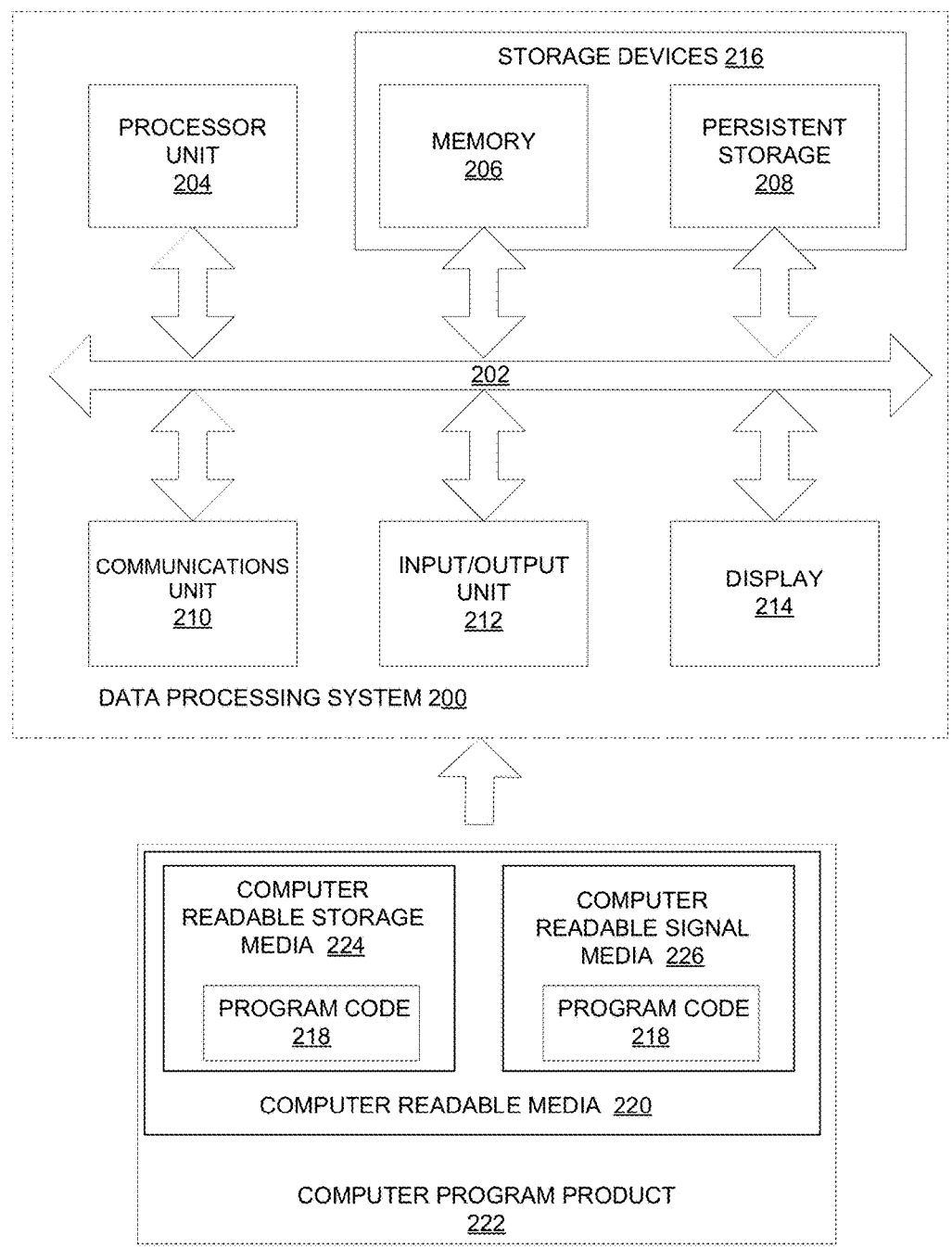
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments of using a sensor array may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Using network data processing system 100 as an example, a computer-implemented method for using a sensor array receives a motion at a receptor of a sensor unit in a set of sensor units, for example at client 110, which causes a displacement of the receptor. The displacement of the receptor is received by the sensor element attached to the receptor and the sensor unit, according to the displacement of the attached receptor, generates a signal. The received signals from the sensor unit are aggregated at a sensor data collector. The received signals are analyzed and vector information is generated, using the aggregation of received signals, as analyzed sensor data output. The vector information is used to control a device, for example server 106 providing streaming audio selections or an application on client 110 controlling volume for an audio player or a user interface display for a list of audio selections.

With reference to FIG. 2 a block diagram of an exemplary data processing system operable for various embodiments of the disclosure of using a sensor array is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for using a sensor array is presented. Responsive to receiving a motion at a receptor of a sensor unit in a set of sensor units, causing a displacement of the receptor, and receiving the displacement of the receptor by the sensor element attached to the receptor, a signal is generated by the sensor unit according to the displacement of the attached receptor. Processor unit 204 receives signals from the sensor unit at a sensor data collector. Processor unit 204 analyzes the received signals and generates vector information as analyzed sensor data output.

Thus is presented in an illustrative embodiment an apparatus for a sensing array comprising a bus, a set of spaced apart elements connected to the bus, wherein each element of the set of elements generates a signal representative of a stimulation received, a signal processor in communication with the bus, wherein the signal processor generates vector information using signals from the set of elements, and a transmitter for sending the vector information to an application interface wherein the vector information indicates a movement within the sensing array.

Figure 3:
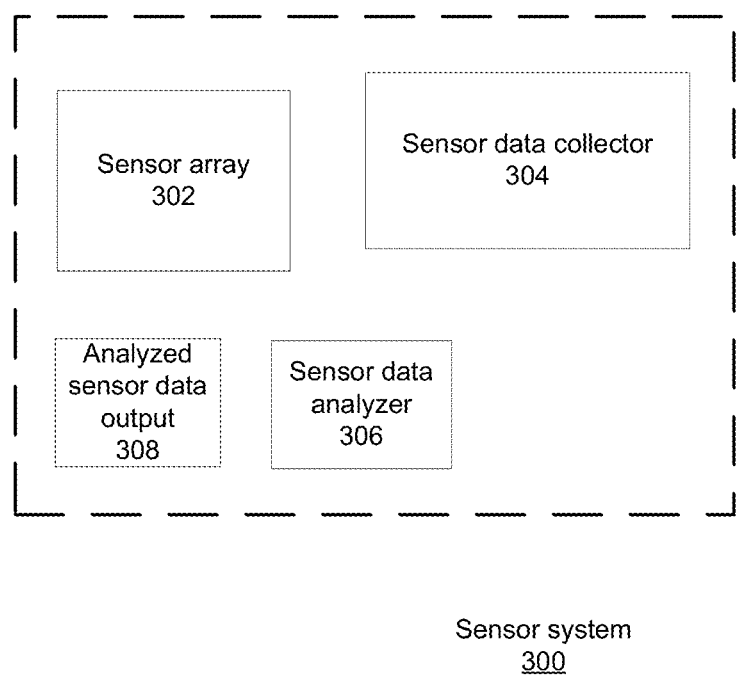
FIG. 3 is a block diagram of a sensor system operable for various embodiments of the disclosure.

With reference to FIG. 3, a block diagram of a sensor system operable for various embodiments of the disclosure is presented. Sensor system 300 is an example of a system having a capability of detecting movement of a portion of an operator and converting the detected movement into a signal for a set of one or more commands instructing an output on a display device. The commands typically perform an object manipulation action.

Sensor system 300 comprises a number of components including sensor array 302, sensor data collector 304, sensor data analyzer 306, and analyzed sensor data output 308. The components may be arranged as separate elements or in combination without loss of function. Sensor system 300 may be implemented in a combination of hardware and software or a hardware only solution.

Sensor array 302 provides a capability to utilize one or more sensor devices in an arrangement to detect a physical movement of a portion of an operator. Sensor array 302 comprises one or more sensor units arranged in a spaced apart configuration as defined for a particular application and physical composition of the sensors. When a plurality of sensor units is employed to form sensor array 302 an attachment is provided to operate as a bus enabling signals generated by each sensor unit in the plurality of sensor units to flow to a collector. In one embodiment, sensor array 302 represents a set of spaced apart sensor units connected to the bus, wherein each element of the set of sensor units comprises a detector, the detector responsive to receiving stimulation of an associated element, wherein the stimulation being other than capacitive or conductive, generates a signal representative of the stimulation received on the bus.

When an individual sensor unit is oriented to detect motion along one axis a corresponding individual sensor unit is arranged in a different orientation to detect motion along an opposing axis. A combination of sensor units thus arranged in sensor array 302 provides a capability to detect motion along a combination of axes.

Sensor data collector 304 provides a capability of receiving sensor signal data from each of the sensor units in plurality of sensor units employed to form sensor array 302. Sensor data collector 304 is capable of receiving sensor signal data in accordance with a type of sensor unit used including data from devices comprising strain gages, transducers, piezoelectric accelerometers, and piezoresistive devices. Data may be collected in one of a digital form or an analog form as generated by the sensor units of sensor array 302.

In one embodiment sensor data collector 304 provides a data structure for temporarily storing data from sensor units for aggregation before making the data available in real time to further processing. In another embodiment sensor data collector 304 provides data from sensor units for further processing in real time.

Sensor data analyzer 306 provides a capability of performing computations on data from sensor units delivered by sensor data collector 304. Analysis computations identify a speed and direction using the sensory information obtained. The speed and direction thus provide vector information resulting from the detected movement of a portion of the operator. In one embodiment sensor data analyzer 306 represents a signal processor in communication with the bus, wherein the signal processor combines a set of signals from the bus to generate a vector representative of an orientation and speed of a movement detected in the set of spaced apart sensor units comprising sensor array 302.

Analyzed sensor data output 308 provides data as in the vector information to a graphics component of the data processing system such as client 110 of network data processing system 100 of FIG. 1 or data processing system 200 of FIG. 2. Analyzed sensor data output 308 may provide in one embodiment a transmitter for sending the vector information to an application interface thus indicating the movement in sensor array 302. In another embodiment analyzed sensor data output 308 may place the vector information in a memory location for use by a graphic processor of the supporting data processing system.

The vector information is used to create object manipulation commands by a graphic processor of the data processing resulting in a change in elements displayed in a user interface. For example, analyzed sensor data output 308 provides vector information indicating a scrolling action through a list of items in a user interface on a display device.

Figure 4:
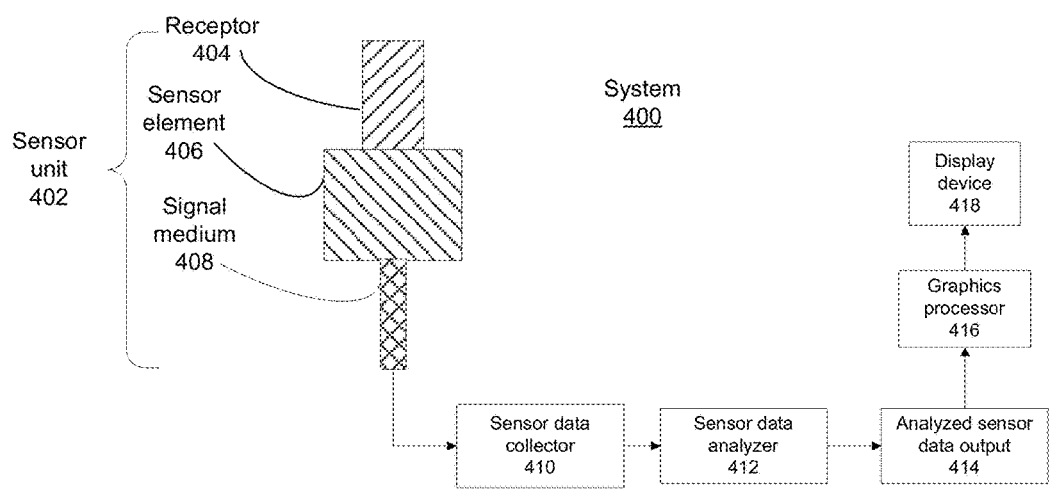
FIG. 4 is a block diagram of a data processing system using a sensor operable for various embodiments of the disclosure.

With reference to FIG. 4 a block diagram of a data processing system using a sensor operable for various embodiments of the disclosure is presented. System 400 is an example of a data processing employing a sensor representative of a sensor in sensor system 300 of FIG. 3.

Sensor unit 402 comprises a number of components including receptor 404, sensor element 406, and signal medium 408. Receptor 404 is a resilient member, which provides a capability of reacting to movement and pressure of a portion of an operator. For example, in one embodiment receptor 404 is implemented using a flexible resilient rubber compound shaped in a columnar form. A set of sensor units in the described embodiment accordingly forms a 'forest' of columns similar to bristles on a brush. The set of sensor units in the example embodiment thus forms sensor array 302 of sensor system 300 of FIG. 3. The sensor array may be included on a surface of a pointing device as described further in FIG. 8.

Sensor element 406 provides a capability of transforming the mechanical motion received through receptor 404 into an electrical signal, which is sent along signal medium 408 to sensor data collector 410. Sensor data analyzer 412 processes the received signals to generate vector information provided as analyzed sensor data 414. Graphic processor 416 receives the analyzed sensor data and processes the received information into rendered information suitable for display device 418. The user interface on display device 418 responds to the rendered information to presents updated visual results to the operator.

Receptor 404 in the current example is provided as a direction and movement-sensing element. Successions of rubber (or other flexible, resilient material) sensitive rectangles (or other suitable shape for a particular instance) are responsible for capturing a speed and direction of a user interaction through use of sensor unit 402. Throughout this document rubber as material and rectangles as the shape are used in the examples, however the disclosed apparatus is not limited to the material as used in the examples because other substances can be used without limitation. Other suitable shapes may also be used.

User interaction with the disclosed apparatus is typically simple. Movement of fingers of the operator is in a slithering (or sliding) motion similar to sliding a finger across a computer keyboard. Rather than gliding across a set of keys, movement is across a set of spaced apart rubber rectangles, which enables the apparatus to sense the pace and direction of the sliding movement.

Embodiments of the disclosed apparatus provide tactile feedback to the user during the slithering movement to enable the user to receive feedback indicative of moving from one rectangle to another rectangle. The space between each rectangle of a sensor array in an embodiment of the disclosed apparatus is relative to a particular implementation. For example, in an industrial application the set of spaced apart rubber rectangles may be implemented as coarse columns with wide gaps defined between each column to accommodate thick gloves worn by a user. In another illustrative embodiment, using a food-processing example, the set of spaced apart rubber rectangles may be implemented as relatively fine columns with narrow gaps defined between each column (relative to the industrial application).

Figure 5:
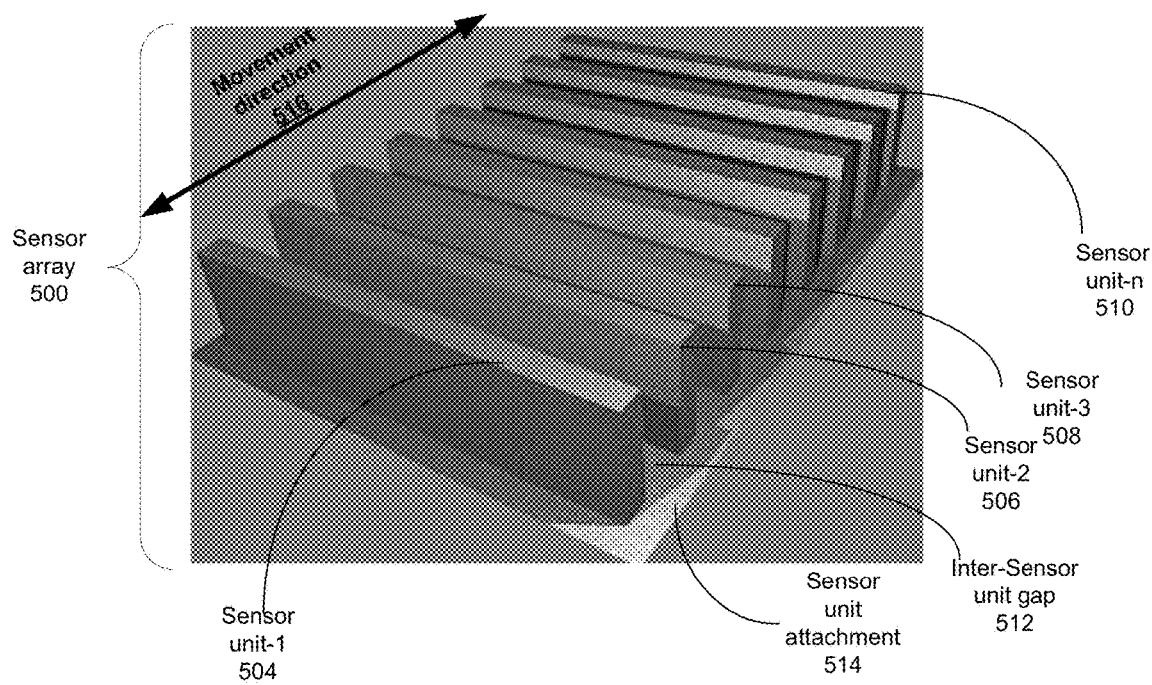
FIG. 5 is a block diagram of a sensor array operable for various embodiments of the disclosure.

With reference to FIG. 5 a block diagram of a sensor array operable for various embodiments of the disclosure is presented. Sensor array 500 is an example of a set of sensors representative of sensor array 302 in sensor system 300 of FIG. 3.

Sensor array 500 in the example comprises a set of sensor units including sensor unit-1 504, sensor unit-2 506, sensor unit-3 508, through to sensor unit-n 510. In the illustrative embodiment, the sensor units are depicted as ribs or ridges with inter-sensor unit gap 512 between each respective sensor unit.

The plurality of sensor units has a common interface in the form of sensor unit attachment 514. Sensor unit attachment 514 provides a capability to form a connecting point supporting the sensor units as well as a bus to connect each signal medium 408 of sensor unit 402 of FIG. 4.

Movement direction 516 indicates an orientation of the sensor units that is suited to linear movement detection along a single axis. In another embodiment a plurality of columns previously described as bristles on a brush may be used to detect movement along axes in two directions.

Figure 6:
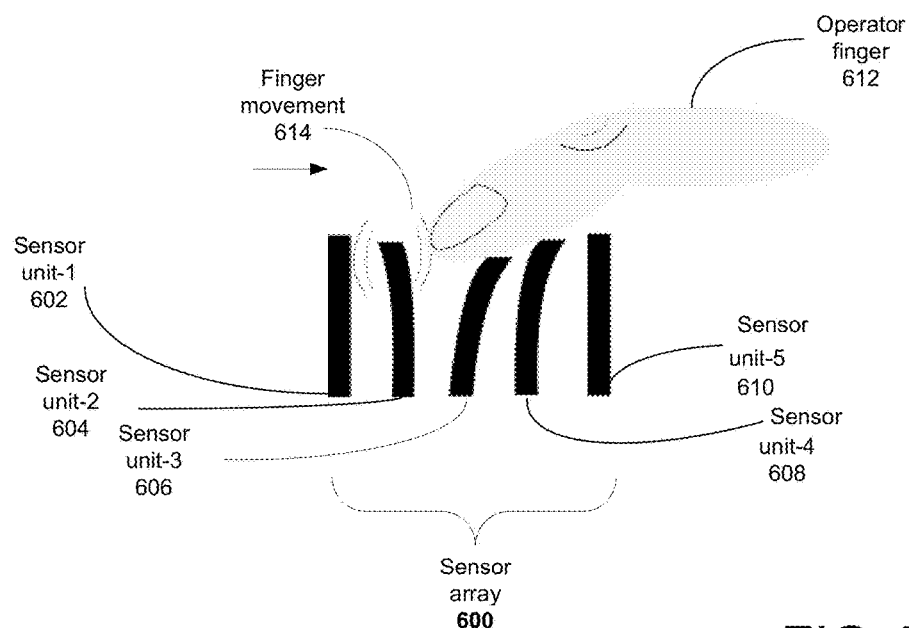
FIG. 6 is a block diagram of using a sensor array operable for various embodiments of the disclosure.

With reference to FIG. 6 a block diagram of using a sensor array operable for various embodiments of the disclosure is presented. Sensor array 600 is an example of a set of sensors representative of sensor array 302 in sensor system 300 of FIG. 3.

Sensor array 600 in the example comprises a set of sensor units including sensor unit-1 602, sensor unit-2 604, sensor unit-3 606, sensor unit-4 608 and sensor unit-5 610. In the illustrative embodiment, the sensor units are depicted as a number of vertical columns having an inter-sensor unit gap between each respective sensor unit.

Operator finger 612 engages the receptors of the sensor units using finger movement 614. The movement causes the receptors engaged to deform or move responsive to a speed and direction of the movement. Displacement of the receptors is indicative of the speed and direction of travel of operator finger 612. There is no need to begin at a specific receptor for direction or speed determination, because the interpretation of movement is calculated using a relative displacement basis.

Although sensor unit-2 604 is displaced opposite to finger movement 614 other sensor units including sensor unit-3 606, sensor unit-4 608 are displaced following finger movement 614. For example, sensor data analyzer 306 of sensor system 300 of FIG. 3 calculates the sensor data received to correctly provide vector information representative of finger movement 614. As finger movement 614 traverses the receptors, vector information representative of finger movement 614 is updated and provided as output to indicate a position, speed and direction of travel.

Figure 7:
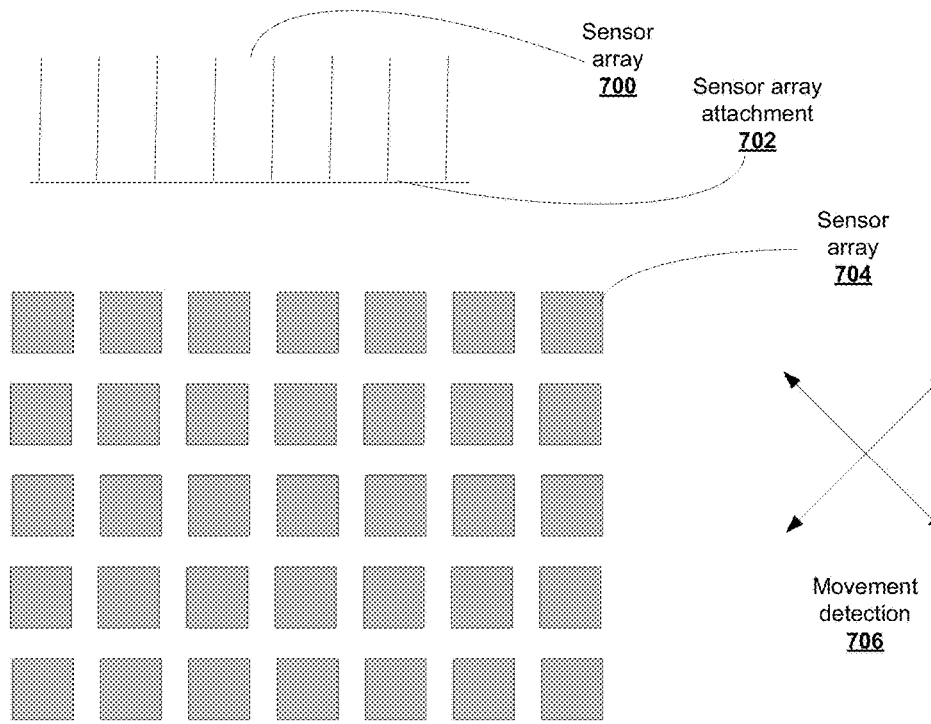
FIG. 7 is a block diagram of a sensor array operable for various embodiments of the disclosure.

With reference to FIG. 7 a block diagram of a sensor array operable for various embodiments of the disclosure is presented. Sensor array 700 is an example of a set of sensors representative of sensor array 302 in sensor system 300 of FIG. 3.

Sensor array 700 is an illustrative embodiment of a particular implementation suited to detecting and providing information representative of a single axis linear motion. Sensor array attachment 702 provides an attachment interface for all signal medium connections and a mounting surface for bonding sensor array 700 to a surface of a pointing device or stationary device used with sensor array 700.

Sensor array 704 provides a capability of a plurality of sensor units combined into a grid pattern. The sensor elements are arranged to provide operator finger displacement as depicted in movement detection 706. Movement detection 706 enables representation of linear movement in two directions along an X-axis, a Y-axis and points in between. In one embodiment, the set of sensor elements (spaced apart elements) of sensor array 704 is arranged in a grid pattern wherein a portion of the set of spaced apart elements is oriented to receive stimulation in a first direction and a portion of the set of spaced apart elements is oriented to receive stimulation in a second direction and a combination of the first direction and the second direction enables a third direction to be inferred.

Embodiments of sensor array 704 may be implemented in a variety of shapes, which can be applied to many different surfaces and to many devices. Embodiments of sensor array 704 can therefore conform to a producer needs in terms size, sensitivity, thickness, height, and sensor shape. Micro-machined sensor units enable reduced scale of embodiments.

Figure 8:
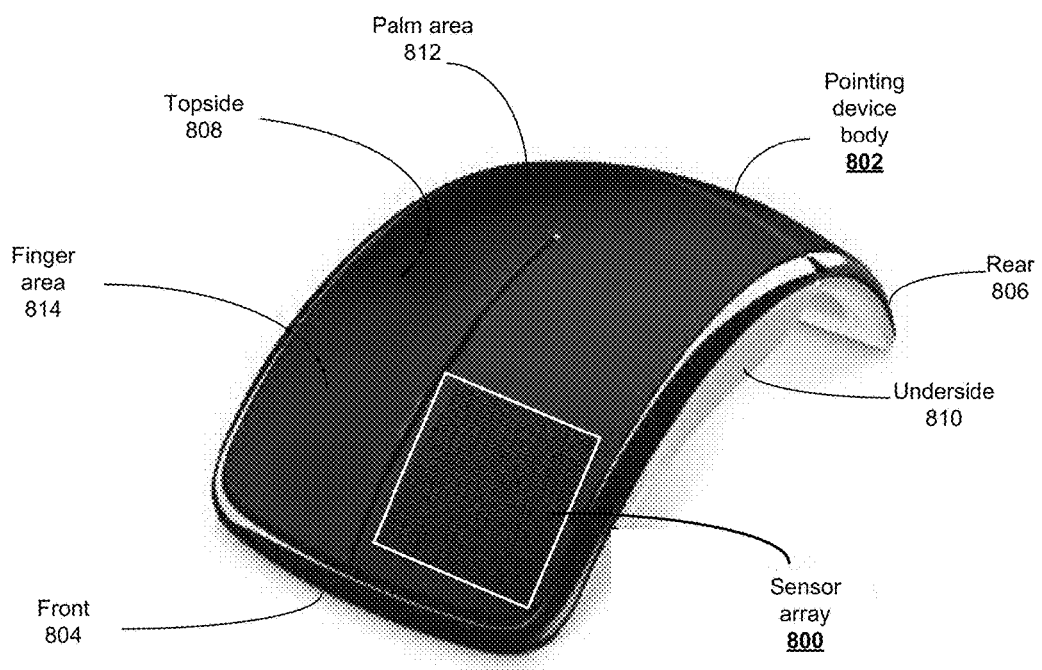
FIG. 8 is a pictorial diagram of a device with a sensor array operable for various embodiments of the disclosure.

With reference to FIG. 8 a pictorial diagram of a device with a sensor array operable for various embodiments of the disclosure is presented. Sensor array 800 is an example of a set of sensors, representative of sensor array 302 in sensor system 300 of FIG. 3, affixed to a pointing device.

Sensor array 800 is shown attached to pointing device body 802. Pointing device body 802 has a portion defined as front 804 and a distal portion defined as rear 806. Topside 808 defines a surface having palm area 812 adjacent rear 806 and finger area 814 adjacent front 804. Underside 810 forms a surface opposite to the surface defined by topside 808.

Pointing device body 802 forms an arcuate shape with palm area 812 raised above either front 804 or rear 806. Sensor array 800 defines an area covering a portion of finger area 814 so as to enable the fingers of an operator to slide over the sensor array 800 in a linear motion which may be described as stroking or slithering, wherein a slither defines a non-linear movement between two points on sensor array 800.

Using the previous examples, each rubber rectangle stimulated (activated) on sensor array 800 sends a signal to a circuit or software, which interprets a time frame in which each rectangle is stimulated to calculate a speed and direction of the interaction.

Calculation of the received sensor data enables identification of relative displacement from any starting location on sensor array 800 as well as vector information representative of speed and direction of traversal of an operator finger. The movement of the rubber rectangles, of the example, produces signals that are translated as scrolling in a same direction as the sensed movement within the currently application on the screen. Using configurable values associated with the vector information input received speed at which a corresponding representation on a display device moves may be controlled to correspond directly or proportionately to suit a user. The sensor units of sensor array 800 can be arranged vertically, horizontally, or in a circular manner as well as on alternative shapes.

With reference to FIG. 9 a flowchart of a processing using a device with a sensor array operable for various embodiments of the disclosure is presented. Process 900 is an example of using a set of sensors, representative of sensor array 302 in sensor system 300 of FIG. 3, affixed to a pointing device.

Process 900 is an example of a computer-implemented method for using a sensor array. The computer-implemented receives a motion at a receptor of a sensor unit in a set of sensor units, causing a displacement of the receptor; receives the displacement of the receptor by the sensor element attached to the receptor; generates a signal by the sensor unit according to the displacement of the attached receptor; receives signals from the sensor unit at a sensor data collector, wherein the signals are aggregated; analyzes the received signals; and generates vector information, using the aggregation of received signals, as analyzed sensor data output.

Process 900 begins (step 902) and receives a motion at a receptor of a sensor unit in a set of sensor units causing a displacement of the receptor (step 904). Process 900 receives the displacement of the receptor from the sensor element attached to the receptor (step 906). The motion causes a displacement of the receptor, which is interpreted by the sensor unit attached. Process 900 may perform a monitoring activity to identify when a motion causing a displacement occurs or in an alternative may sleep until a signal resulting from a displacement occurs.

Process 900 generates a signal using the sensor unit according to the displacement of the attached receptor (step 908). The signal is representative of the intensity and direction of the motion received.

Process 900 receives signals from the sensor unit at a sensor data collector (step 910). A signal from each sensor unit, generating a signal, in a plurality of sensor units is collected using the sensor data collector. Sensor units, which have not been displaced through a motion activating the receptor, do not generate a signal. The sensor unit further comprises a receptor for receiving a stimulation, a sensor element for transforming a received stimulation into a signal and a signal medium for transmitting the signal from the element to a sensor data collector, wherein the element is a sensor unit. The receiving of a motion at a receptor of a sensor unit in a set of sensor units, causes a displacement of the receptor further comprising deforming the receptors engaged responsive to a speed and direction of the motion and wherein the displacement of the receptors is indicative of the speed and direction of travel of the motion.

Process 900 analyzes the received signals (step 912). Analysis of the received signals identifies information including force, speed and direction of the received motion and resulting displacement of the associated receptor. Analyzing the received signals further comprises analyzing the received signals from the set of sensor elements wherein the set of sensor elements is arranged in a grid pattern wherein a portion of the set of spaced apart elements is oriented to receive stimulation along a first axis and a remaining portion of the set of spaced apart elements is oriented to receive stimulation along a second axis and a combination of a first axial direction and a second axial direction enables a third axial direction to be inferred. The analyzing of the received signals further comprises analyzing the received signals from the set of sensor elements wherein the set of sensor elements is oriented to receive stimulation in one axial direction. The receiving of signals comprises at least one of a digital signal and an analog signal.

Using the analysis process 900 generates vector information as analyzed sensor data output (step 914). The vector information is used in subsequent processing or applications including controlling devices including music players such a volume control or a browsing activity using a plurality of choices. The vector information is forwarded and used as control input values for receiving controller functions. Generating vector information as analyzed sensor data output further comprises sending the vector information to a controller, wherein the controller controls an action including at least one of a user interface display on a display device, and a device setting operation.

The vector information is indicative of speed and direction of travel of the stimulation and independent of a specific receptor for direction and speed determination, wherein interpretation of movement is calculated using a relative displacement basis. Analyzing of the received signals further comprises aggregating a set of signals from the bus (connecting the sensor units of the sensor array) to generate vector information representative of an orientation and speed of a movement detected in the set of spaced apart elements.

Process 900 determines whether motion is detected at other sensors (step 916). Responsive to a determination that motion is detected at other sensors, process 900 returns to perform step 904 as before. Responsive to a determination that motion is not detected at other sensors, process 900 terminates (step 918).

Thus is presented in an illustrative embodiment a computer-implemented process for using a sensor array. The computer-implemented method receives a motion at a receptor of a sensor unit in a set of sensor units, causing a displacement of the receptor. Receipt of the displacement of the receptor by the sensor element attached to the receptor generates a signal by the sensor unit according to the displacement of the attached receptor. The computer-implemented method further receives signals from the sensor unit at a sensor data collector, analyzes the received signals and generates vector information as analyzed sensor data output.

Thus is presented in an illustrative embodiment an apparatus for a sensing array comprising a bus, a set of spaced apart elements connected to the bus, wherein each element of the set of elements generates a signal representative of a stimulation received, a signal processor in communication with the bus, wherein the signal processor generates vector information using signals from the set of elements and a transmitter for sending the vector information to an application interface wherein the vector information indicates a movement within the sensing array.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In an embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage medium having computer executable instructions stored thereon in a variety of forms. Examples of computer readable data storage media include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. An apparatus for a sensing array, the apparatus comprising:
    a bus;
    a plurality of spaced apart deformable elements connected to the bus, the deformable elements comprising elongated rectangular ribs, each pair of the elongated rectangular ribs separated by an inter-sensor unit gap sized to accommodate a finger within a glove, wherein each element of the plurality of elements generates a signal representative of a stimulation received, the stimulation comprising a direct physical contact of a gloved finger of a user with the element and a temporary deformation of the element in a direction of movement of the gloved finger of the user, each individual element providing independent tactile feedback to the finger of the user within the glove as the gloved finger of the user is moved from one of the elements to another of the elements;
    a signal processor in communication with the bus, wherein the signal processor generates vector information using an aggregation of the signals from the plurality of elements; and
    a transmitter for sending the vector information to an application interface, wherein the vector information indicates a movement of the gloved finger of the user across the deformable elements of the sensing array.

2. The apparatus of claim 1, wherein the bus further comprises:
    a sensor data collector for collecting signals representative of the stimulation received from each element of the plurality of elements.

3. The apparatus of claim 1, wherein each element of the plurality of elements is a sensor unit comprising:
    a receptor for receiving a stimulation;
    a sensor element for transforming a received stimulation into a signal; and
    a signal medium for transmitting the signal from the element to a sensor data collector.

4. The apparatus of claim 1, wherein the stimulation received is other than capacitive or conductive.

5. The apparatus of claim 1, wherein a signal processor in communication with the bus further comprises:
    a sensor data analyzer for processing each signal representative of the stimulation received from each element of the plurality of elements, wherein the sensor data analyzer aggregates a set of signals from the bus to generate vector information representative of an orientation and speed of a movement detected in the plurality of elements.

6. The apparatus of claim 1, wherein the plurality of elements comprises:
    a plurality of sensor units, wherein each sensor unit is separated from an adjacent sensor unit by the inter-receptor gap; and
    a sensor unit attachment, wherein each sensor unit is connected to the sensor unit attachment, using the signal medium, for transmitting a signal representative of the stimulation received.

7. The apparatus of claim 1, wherein the plurality of elements comprises a sensor array.

8. The apparatus of claim 1, wherein the plurality of elements is oriented to receive stimulation along one axis.

9. The apparatus of claim 1, wherein the transmitter for sending the vector information to an application interface further comprises:
    sending the vector information to a controller, wherein the controller controls an action including at least one of a user interface display on a display device, and a device setting operation.

10. The apparatus of claim 1, wherein the sensor array is included on a surface of a pointing device.

11. A computer-implemented method for using a sensor array, the computer-implemented method comprising:
    at each of a plurality of sensor units in the sensor array, wherein each sensor unit includes a deformable receptor attached to a sensor element, each deformable element comprises an elongated rectangular rib, each pair of the elongated rectangular ribs of the plurality of sensor units separated by an inter-sensor unit gap sized to accommodate a finger within a glove:
        receiving a motion at the deformable receptor of the sensor unit, causing a displacement of the receptor, in response to a direct physical contact of the gloved finger of a user with the receptor and a temporary deformation of the receptor in a direction of movement of the gloved finger of the user across the receptor, each individual receptor providing independent tactile feedback to the finger within the glove of the user as the gloved finger of the user is moved from one of the receptors to another of the receptors;
        detecting the displacement of the receptor at the sensor element attached to the receptor; and
        generating a signal by the sensor unit according to the displacement of the attached receptor;
    receiving the generated signals from the plurality of sensor units at a sensor data collector, the sensor data collector aggregating the received signals from the plurality of sensor units;
    analyzing the received signals; and generating vector information indicating a movement of the gloved finger of the user across the deformable elements of the sensing array, using the aggregation of received signals, as analyzed sensor data output.

12. The computer-implemented method of claim 11, wherein each sensor unit further comprises:
the receptor for receiving a stimulation;
the sensor element for transforming a received stimulation into a signal; and
a signal medium for transmitting the signal from the element to a sensor data collector.

13. The computer-implemented method of claim 11, wherein analyzing the received signals further comprises:
analyzing the received signals from the sensor elements, wherein the sensor elements are oriented to receive stimulation in one axial direction.

14. The computer-implemented method of claim 11, wherein receiving signals from the sensor unit at a sensor data collector further comprises:
receiving one of a digital signal and an analog signal.

15. The computer-implemented method of claim 11, wherein generating vector information as analyzed sensor data output further comprises:
sending the vector information to a controller, wherein the controller controls an action including at least one of a user interface display on a display device, and a device setting operation.

16. The computer-implemented method of claim 11, wherein generating vector information as analyzed sensor data output further comprises:
generating vector information indicative of speed and direction of travel of the stimulation and independent of a specific receptor for direction and speed determination, wherein interpretation of movement is calculated using a relative displacement basis.

17. The computer-implemented method of claim 11, wherein analyzing the received signals further comprises:
aggregating a set of signals to generate vector information representative of an orientation and speed of a movement detected in the sensor elements.

18. The computer-implemented method of claim 11, further comprising:
deforming the receptors engaged responsive to a speed and direction of the motion and wherein the displacement of the receptors is indicative of the speed and direction of travel of the motion.

* * * * *